(12) United States Patent
Zheng et al.

(10) Patent No.: US 11,367,310 B2
(45) Date of Patent: Jun. 21, 2022

(54) METHOD AND APPARATUS FOR IDENTITY VERIFICATION, ELECTRONIC DEVICE, COMPUTER PROGRAM, AND STORAGE MEDIUM

(71) Applicant: SHENZHEN SENSETIME TECHNOLOGY CO., LTD., Shenzhen (CN)

(72) Inventors: Guirong Zheng, Shenzhen (CN); Miaoran Xu, Shenzhen (CN); Xubo Xiang, Shenzhen (CN); Conghong Zhong, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 696 days.

(21) Appl. No.: 16/314,387

(22) PCT Filed: Oct. 24, 2018

(86) PCT No.: PCT/CN2018/111741
§ 371 (c)(1),
(2) Date: Dec. 28, 2018

(87) PCT Pub. No.: WO2019/200872
PCT Pub. Date: Oct. 24, 2019

(65) Prior Publication Data
US 2021/0271857 A1    Sep. 2, 2021

(30) Foreign Application Priority Data
Apr. 16, 2018   (CN) .......................... 201810339526.0

(51) Int. Cl.
*G06V 40/00* (2022.01)
*G06V 40/16* (2022.01)
*G06V 30/413* (2022.01)

(52) U.S. Cl.
CPC .......... *G06V 40/172* (2022.01); *G06V 30/413* (2022.01); *G06V 40/166* (2022.01); *G06V 40/171* (2022.01)

(58) Field of Classification Search
CPC ........... G06K 9/00288; G06K 9/00255; G06K 9/00281; G06K 9/00456; G06K 9/6215;
(Continued)

(56) References Cited

U.S. PATENT DOCUMENTS 6,539,101 B1    3/2003  Black
10,452,897 B1*  10/2019 Benkreira ............ G06V 40/168
(Continued)

FOREIGN PATENT DOCUMENTS

CN    102129555 A    7/2011
CN    103425972 A    12/2013
(Continued)

OTHER PUBLICATIONS

First Office Action of the Chinese application No. 201810339526.0, dated Mar. 25, 2020.
(Continued)

*Primary Examiner* — Md K Talukder
(74) *Attorney, Agent, or Firm* — Syncoda LLC; Feng Ma (57) ABSTRACT

A method and an apparatus for identity verification, an electronic device, a computer program, and a storage medium include: obtaining a first image of a document, where the first image contains a first face image; obtaining a second image containing a face of a to-be-verified person; performing face comparison on the first image and the second image to obtain a first comparison result; and obtaining an identity verification result according to the first comparison result.

14 Claims, 7 Drawing Sheets

(58) Field of Classification Search
CPC .. G06V 40/172; G06V 30/413; G06V 40/166; G06V 40/171; G06V 10/22; G06V 40/168; G06V 40/16; G06Q 20/40145; G06Q 20/341; G06F 21/32; G06F 21/45; G06T 7/0014; G06T 2207/30201

See application file for complete search history.

(56) References Cited

U.S. PATENT DOCUMENTS

| | | | |
|---|---|---|---|
| 2014/0294258 A1* | 10/2014 | King | G06V 40/172 382/118 |
| 2014/0363057 A1 | 12/2014 | Eckel et al. | |
| 2015/0086088 A1* | 3/2015 | King | G06V 40/16 382/118 |
| 2016/0275518 A1 | 9/2016 | Bowles et al. | |
| 2017/0103260 A1 | 4/2017 | Eckel et al. | |
| 2017/0351909 A1 | 12/2017 | Kaehler | |
| 2018/0181834 A1* | 6/2018 | Cui | G06K 9/6277 |
| 2019/0065844 A1 | 2/2019 | Eckel et al. | |
| 2020/0042772 A1* | 2/2020 | Feng | G06K 9/6215 |
| 2020/0184201 A1 | 6/2020 | Kaehler | |
| 2021/0271857 A1* | 9/2021 | Zheng | G06Q 20/40145 |

FOREIGN PATENT DOCUMENTS

| | | |
|---|---|---|
| CN | 103426016 A | 12/2013 |
| CN | 204155293 U | 2/2015 |
| CN | 105930709 A | 9/2016 |
| CN | 105956578 A | 9/2016 |
| CN | 106650560 A | 5/2017 |
| CN | 106778525 A | 5/2017 |
| CN | 107729847 A | 2/2018 |
| CN | 107832679 A | 3/2018 |
| JP | 2006079382 A | 3/2006 |
| WO | 2016149346 A1 | 9/2016 |
| WO | 2017210419 A1 | 12/2017 |

OTHER PUBLICATIONS

First Office Action of the Korean application No. 10-2019-7022691, dated Oct. 28, 2020.
International Search Report in the international application No. PCT/CN2018/111741, dated Dec. 28, 2018.
Taiwanese Search Report in the Taiwanese application No. 107147020, dated Nov. 25, 2019.
Supplementary European Search Report of European Application No. 18904491.0, dated May 7, 2021.
Decision of Refusal of Japanese Application No. 2019-571204, dated Jun. 8, 2021.
Written Opinion of the International Search Authority of International Application No. PCT/CN2018/111741, dated Dec. 28, 2018.
First Office Action of the European application No. 18904491.0, dated Jan. 27, 2022.

* cited by examiner

METHOD AND APPARATUS FOR IDENTITY VERIFICATION, ELECTRONIC DEVICE, COMPUTER PROGRAM, AND STORAGE MEDIUM

CROSS-REFERENCE TO RELATED APPLICATION

The present disclosure claims priority to Chinese Patent Application No. 201810339526.0, filed on Apr. 16, 2018, the disclosure of which is incorporated herein by reference in its entirety.

TECHNICAL FIELD

The present disclosure belongs to the field of computer vision technologies, and in particular, to a method and an apparatus for identity verification, an electronic device, a computer program, and a storage medium.

BACKGROUND

Face recognition, also referred to as portrait recognition or facial recognition, is a biological recognition technology for performing identity recognition based on a person's facial feature information, and is a series of related technologies for detected faces by performing automatic face detection and tracking on images or video streams containing faces. In recent years, with the emergence of a machine learning technology and the popularization and application thereof in the field of face recognition, the development and maturity of face recognition technology are promoted.

A person's facial features are one of the person's inherent biological features, and therefore, the face recognition can be applied to the person's identity verification as an identity verification technology.

SUMMARY

Embodiments of the present disclosure provide identity verification technical solutions.

A method for identity verification provided according to one aspect of the embodiments of the present disclosure includes: obtaining a first image of a document, where the first image contains a first face image; obtaining a second image containing a face of a to-be-verified person; performing face comparison on the first image and the second image to obtain a first comparison result; and obtaining an identity verification result according to the first comparison result.

In an embodiment, before the obtaining a first image of a document, the method further includes: obtaining attributes of the document, the attributes including a built-in chip document and a non-built-in chip document; and obtaining, when the document is a non-built-in chip document, the first image of the document, where the first image contains a first face image.

In an embodiment, the method further includes: performing authenticity recognition processing on the document when the document is a built-in chip document; and obtaining the second image containing the face of the to-be-verified person when the authenticity recognition processing result of the document indicates that the document is an authentic document.

In an embodiment, the performing authenticity recognition processing on the document includes: obtaining a third image of the document, where the third image contains an external face image; obtaining chip information of the document, where the chip information contains a preset second face image; comparing the external face image with the second face image to obtain a second comparison result; and determining the authenticity of the document according to the second comparison result.

In an embodiment, the performing face comparison on the first image and the second image to obtain a first comparison result includes: performing face feature extraction on the face image in the first image to obtain first face feature data; performing face feature extraction on the second image to obtain at least one group of second face feature data; and separately comparing the first face feature data with any of the at least one group of second face feature data to obtain a third comparison result.

In an embodiment, the separately comparing the first face feature data with any of the at least one group of second face feature data to obtain a third comparison result includes: separately calculating a first similarity between the first face feature data and any of the at least one group of second face feature data; and using the calculated at least one group of first similarities as the third comparison result.

In an embodiment, the obtaining an identity verification result according to the first comparison result includes: determining that identity verification succeeds when any of the at least one group of first similarities is greater than a preset threshold; and determining that identity verification fails when the at least one group of first similarities is less than or equal to the preset threshold.

In an embodiment, after the obtaining an identity verification result according to the first comparison result, the method further includes: displaying the face image in the first image, the second image, and the identity verification result.

In an embodiment, before the performing face comparison on the first image and the second image to obtain a first comparison result, the method further includes: processing the first image to separate the first face image and/or text part in the first image.

In an embodiment, before the separating the face image and/or text part in the first image, the method further includes: determining whether the first image contains a face image; and prompting a user to relocate the document if the first image does not contain a face image.

In an embodiment, the method further includes: determining whether the first image contains a text part; and performing, if the first image contains a text part, text recognition processing on the text part in the first image to obtain text information in the document.

In an embodiment, the performing text recognition processing on the text part in the first image to obtain text information in the document includes: performing feature extraction on the text part in the first image to obtain feature data of the text part; determining a second similarity between the feature data of the text part and feature data corresponding to a preset text in a preset database; using the preset text corresponding to the second similarity as a text recognition result when the second similarity is greater than a similarity threshold; and obtaining the text information in the document according to the text recognition result.

In an embodiment, the method further includes: displaying the face image in the first image, the second image, the identity verification result, and the text information in the document.

An identity verification apparatus provided according to another aspect of the embodiments of the present disclosure includes:

a first image acquisition unit, configured to obtain a first image of a document, where the first image contains a first face image;

a second image acquisition unit, configured to obtain a second image containing a face of a to-be-verified person;

an image comparison unit, configured to perform face comparison on the first image obtained by the first image acquisition unit and the second image obtained by the second image acquisition unit to obtain a first comparison result; and an identity verification unit, configured to obtain an identity verification result according to the first comparison result obtained by the image comparison unit.

In an embodiment, the apparatus further includes: an attribute obtaining unit, configured to obtain attributes of the document, the attributes including a built-in chip document and a non-built-in chip document;

the first image acquisition unit is further configured to obtain, when the document is a non-built-in chip document, the first image of the document, where the first image contains a first face image.

In an embodiment, the apparatus further includes: an authenticity recognition unit, configured to perform authenticity recognition processing on the document when the document is a built-in chip document;

the second image acquisition unit is further configured to obtain the second image containing the face of the to-be-verified person when the authenticity recognition processing result of the document indicates that the document is an authentic certificate.

In an embodiment, the first image acquisition unit is further configured to obtain a third image of the document, where the third image contains an external face image;

the apparatus further includes: a chip recognizer, configured to obtain chip information of the document, where the chip information contains a preset second face image;

the authenticity recognition unit is configured to compare the external face image with the second face image to obtain a second comparison result, and determine the authenticity of the document according to the second comparison result.

In an embodiment, the image comparison unit is configured to perform face feature extraction on the face image in the first image to obtain first face feature data, perform face feature extraction on the second image to obtain at least one group of second face feature data, and separately compare the first face feature data with any of the at least one group of second face feature data to obtain a third comparison result.

In an embodiment, the image comparison unit is configured to separately calculate a first similarity between the first face feature data and any of the at least one group of second face feature data, and use the calculated at least one group of first similarities as the third comparison result.

In an embodiment, the identity verification unit is configured to determine that identity verification succeeds when any of the at least one group of first similarities is greater than a preset threshold, and determine that identity verification fails when the at least one group of first similarities is less than or equal to the preset threshold.

In an embodiment, the apparatus further includes: an information display unit, configured to display the face image in the first image, the second image, and the identity verification result.

In an embodiment, the apparatus further includes: an image-text separation unit, configured to process the first image to separate the first face image and/or text part in the first image.

In an embodiment, the apparatus further includes: a first detection unit, configured to determine whether the first image contains a face image; and an information prompt unit, configured to prompt a user to relocate the document when the first detection unit determines that the first image does not contain a face image.

In an embodiment, the apparatus further includes: a second detection unit, configured to determine whether the first image contains a text part; and a text recognition unit, configured to perform, when the second detection unit determines that the first image contains a text part, text recognition processing on the text part in the first image to obtain text information in the document.

In an embodiment, the text recognition unit is configured to perform feature extraction on the text part in the first image to obtain feature data of the text part, determine a second similarity between the feature data of the text part and feature data corresponding to a preset text in a preset database, use the preset text corresponding to the second similarity as a text recognition result when the second similarity is greater than a similarity threshold, and obtain the text information in the document according to the text recognition result.

In an embodiment, the apparatus further includes: an information display unit, configured to display the face image in the first image, the second image, the identity verification result, and the text information in the document.

An electronic device provided according to still another aspect of the embodiments of the present disclosure includes the apparatus for identity verification according to any one of the embodiments.

An electronic device provided according to yet another aspect of the embodiments of the present disclosure includes: a processor and a memory configured to store a computer program that can run on the processor, where the processor is configured to execute the method for identity verification according to any one of the embodiments when running the computer program.

A computer program provided according to yet another aspect of the embodiments of the present disclosure includes a computer-readable code, where when the computer-readable code runs in a device, a processor in the device executes instructions for implementing the method for identity verification according to any one of the embodiments.

A computer storage medium provided according to yet another aspect of the embodiments of the present disclosure is configured to store computer-readable instructions, where when the instructions are executed, a computer executes the method for identity verification according to any one of the embodiments.

The technical solutions provided in the embodiments of the present disclosure may include the following beneficial effects:

Based on the method and apparatus for identity verification, the electronic device, the computer program, and the storage medium provided in the embodiments of the present disclosure, by performing face comparison on the acquired face image in the document and the face image acquired in real time, the identity verification of a holder of the document can be implemented when there is no chip reader, so that the inconsistency of the holder and the document and the theft of other's identity can be effectively prevented. Identity verification can be performed by using a document in which no chip is built, and therefore, the identity verification is more flexible, so that the application scenarios of the identity verification are expanded.

It should be understood that, the above general description and the following detailed description are merely exemplary and explanatory and are not intended to limit the present invention.

BRIEF DESCRIPTION OF DRAWINGS

The accompanying drawings constituting a part of the specification are used for describing embodiments of the present disclosure, illustrate the embodiments conforming to the present disclosure, and are intended to explain the principles of the present disclosure together with the descriptions.

According to the following detailed descriptions, the present disclosure can be understood more clearly with reference to the accompanying drawings.

DETAILED DESCRIPTION

Various exemplary embodiments of the present disclosure are now described in detail with reference to the accompanying drawings. It should be noted that, unless otherwise stated specifically, relative arrangement of the components, the numerical expressions, and the values set forth in the embodiments are not intended to limit the scope of the present disclosure.

In addition, it should be understood that, for ease of description, a size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to computer systems/servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer systems/servers may be described in the general context of computer system executable instructions (for example, program modules) executed by the computer system. Generally, the program modules may include routines, programs, target programs, components, logics, data structures, and the like, to perform specific tasks or implement specific abstract data types. The computer systems/servers may be practiced in the distributed cloud computing environments in which tasks are performed by remote processing devices that are linked through a communications network. In the distributed computing environments, program modules may be located in local or remote computing system storage medium including storage devices.

At present, when an identity verification all-in-one machine widely used in telecommunications service halls, banks, hotels, Internet bars, airports, stations, and the like performs identity verification, mostly information of a chip built in an ID card is obtained by means of a chip recognizer, and then a photo stored in the chip information is compared with an image of a holder of the ID card acquired by a camera on the scene to verify the consistency of the holder and the ID card. Such identity verification all-in-one machine operates at high speed, has high accuracy, and can effectively prevent the inconsistency of the holder and the ID card and the theft of other's identity. However, in some countries, such as Singapore, there is no built-in chip in the ID card, and thus, identity verification cannot be performed in the identity verification mode above.

To solve the problem, an embodiment of the present disclosure provides a method for identity verification. The process of the method for identity verification provided in the embodiment of the present disclosure is described below in detail with reference to FIG. 1.

Figure 1:
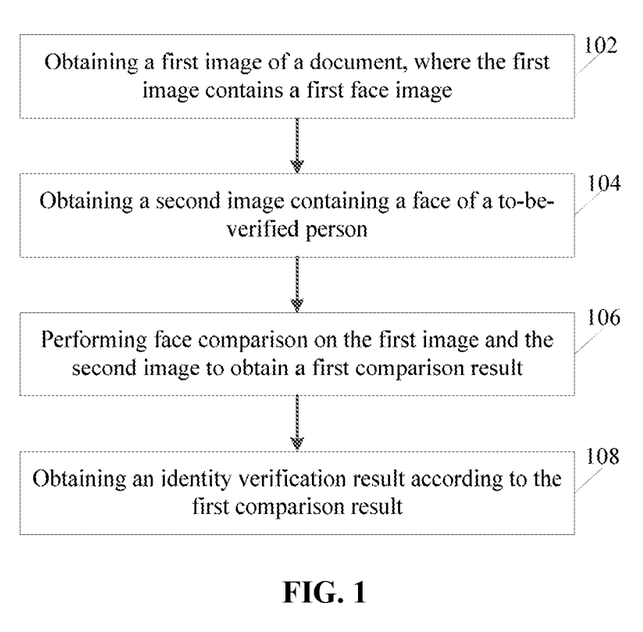
FIG. 1 is a flowchart I of a method for identity verification provided according to an embodiment of the present disclosure.

It should be understood that, the example shown in FIG. 1 is merely intended to help a person skilled in the art better understand the technical solution of the present disclosure, and should not be understood to limit the present disclosure. A person skilled in the art can make various transformations on the basis of FIG. 1; however, such transformations should also be understood to be a part of the technical solution of the present disclosure.

As shown in FIG. 1, the method includes the following steps.

Step 102, a first image of a document is obtained, where the first image contains a first face image.

In the embodiment of the present disclosure, the document is a generic name of various certificates, cards, certificate photos and receipts. For example, the various certificates may be certificates containing a face photo such as ID cards, driving licenses, passports, student ID cards, or employee ID cards; the certificate photos may be black and white or color photos, etc. The first image may be an image acquired from a document containing a face photo. No limitation is made thereto in the embodiment of the present disclosure.

In the embodiment of the present disclosure, the first image of the document may be obtained by a first image acquisition unit. In an actual application, the first image acquisition unit includes, but is not limited to, a camera, a scanner, or a digital camera, or the like, and therefore, first the current document is scanned by the scanner, or the current document is photographed by the camera/the digital camera, and then the first image is obtained by means of Optical Character Recognition (OCR). No limitation is made thereto in the embodiment of the present disclosure.

Step 104, a second image containing a face of a to-be-verified person is obtained.

In the embodiment of the present disclosure, the second image of the face of the to-be-verified person may be obtained by a second image acquisition unit; the second image may be an image acquired in real time on the scene, the second image acquisition unit may be a camera or a digital camera or the like, and therefore, the second image may be obtained by photographing the to-be-verified person by the camera or the digital camera. No limitation is made thereto in the embodiment of the present disclosure. The first image acquisition unit may be the same as or different from the second image acquisition unit.

In an optional embodiment, the first image acquisition unit and the second image acquisition unit may be the same image acquisition unit. For example, the current document may be photographed by the camera or the digital camera, and then the first image is obtained by means of OCR; then the second image is obtained by photographing the to-be-verified person is photographed by the camera or the digital camera.

Step 106, face comparison is performed on the first image and the second image to obtain a first comparison result.

In an embodiment, face feature extraction may be performed on the face image in the first image to obtain first face feature data, face feature extraction may be performed on the second image to obtain at least one group of second face feature data, and the first face feature data is separately compared with any of the at least one group of second face feature data to obtain a third comparison result.

Because the second image may be an image acquired in real time on the scene, when the image is acquired on the scene, the second image may contain only the face of the to-be-verified person, and may also contain a face of other person in addition to the face of the to-be-verified person. When the second image only contains the face of the to-be-verified person, feature extraction is performed on the second image to obtain a group of second face feature data. When the second image contains the face of other person in addition to the face of the to-be-verified person, feature extraction is performed on the second image, and a group of second face feature data will be obtained for each face in the second image.

In an embodiment, the separately comparing the first face feature data with any of the at least one group of second face feature data to obtain a third comparison result includes: separately calculating a first similarity between the first face feature data and any of the at least one group of second face feature data; and using the calculated at least one group of first similarities as the third comparison result.

As an implementation, the separately comparing the first face feature data with any of the at least one group of second face feature data includes: comparing the first face feature data with any group of second face feature data through a neural network or other machine learning method. In an optional example, the neural network may use a convolutional neural network. Optionally, the neural network may also use other type of neural network. No limitation is made thereto in the embodiment of the present disclosure.

As an implementation, the separately calculating a first similarity between the first face feature data and any of the at least one group of second face feature data includes: determining the first similarity between the first face feature data and the any group of second face feature data through the Euclidean distance or other similarity determining rule. No limitation is made thereto in the embodiment of the present disclosure.

Step 108, an identity verification result is obtained according to the first comparison result.

As an implementation, the calculated at least one group of first similarities may be compared with a preset threshold to obtain the identity verification result, where when any of the at least one group of first similarities is greater than the preset threshold, it is determined that identity verification succeeds, i.e., the to-be-verified person is the same as the person in the face photo in the document; and when the at least one group of first similarities is less than or equal to the preset threshold, it is determined that identity verification fails, i.e., the to-be-verified person is different from the person in the face photo in the document. The preset threshold may be determined according to statistics or other method. No limitation is made thereto in the embodiment of the present disclosure.

In an embodiment, after the identity verification result is obtained according to the face comparison result of the first image and the second image, the face image in the first image, the second image, and the identity verification result may further be displayed, for example, the identity verification result is identified by text information "verification succeeds/verification fails", or an icon.

In an optional example, the face comparison result of the first image and the second image may further be displayed while the face image in the first image, the second image, and the identity verification result are displayed, for example, the similarity value represented in the form of percentage.

Based on the method for identity verification provided in the foregoing embodiment of the present disclosure, the first image of the document is obtained, where the first image contains a first face image, the second image containing a face of a to-be-verified person is obtained, face comparison is performed on the first image and the second image to obtain a comparison result, and an identity verification result is obtained according to the comparison result. Therefore, by performing face comparison on the acquired face image in the document and the face image acquired in real time, the identity verification of a holder of the document can be implemented when there is no chip reader, so that the inconsistency of the holder and the document and the theft of other's identity can be effectively prevented. Identity verification can be performed by using a document in which no chip is built, and therefore, the identity verification is more flexible, so that the application scenarios of the identity verification are expanded.

Optionally, in each of the foregoing embodiments, before obtaining the first image of the document, attributes of the document may further be obtained, where the attributes of the document may include a built-in chip document and a non-built-in chip document. When the document is a non-built-in chip document, the operations in each of the foregoing embodiments may be performed for identity verification, i.e., the operations are performed starting from obtaining the first image of the document, where the first image contains the first face image, till the identity verification result is obtained. The attributes of the document are distinguished according to whether a chip is built in, and the mode of identity verification may be determined according to the attribute of the current document, thereby improving the flexibility and university of identity verification.

Optionally, when the document is a built-in chip document, chip information of the document may further be obtained, where the chip information contains a preset second face image, the second image containing the face of the to-be-verified person is obtained, the second image is compared with the preset second face image in the chip information to obtain a comparison result, and an identity verification result is obtained according to the comparison result. Identity verification is performed based on the attributes of the document, and therefore, the identity verification is more flexible, so that the application scenarios of the identity verification are expanded.

In an embodiment, when the document is a built-in chip document, the method further includes: performing authenticity recognition processing on the document; and obtaining the second image containing the face of the to-be-verified person when the authenticity recognition processing result of the document indicates that the document is an authentic document, i.e., identity verification may be performed through the method above.

In an optional example, external information of the document and information stored in the document may be obtained by a first image acquisition apparatus and a chip recognizer, respectively; the external information of the document is compared with the information stored in the document, so as to recognize the authenticity of the document. The process of performing authenticity recognition processing on the current document by using the first image acquisition apparatus and the chip recognizer in the method for identity verification provided in the embodiment of the present disclosure is described in detail below in combination with FIG. 2.

Figure 2:
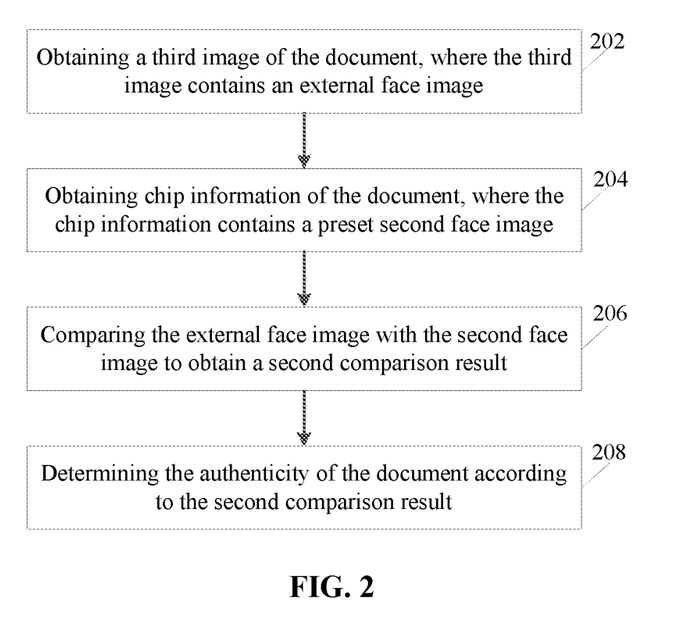
FIG. 2 is a flowchart II of a method for identity verification provided according to an embodiment of the present disclosure.

It should be understood that, the example shown in FIG. 2 is merely intended to help a person skilled in the art better understand the technical solution of the present disclosure, and should not be understood to limit the present disclosure. A person skilled in the art can make various transformations on the basis of FIG. 2; however, such transformations should also be understood to be a part of the technical solution of the present disclosure.

As shown in FIG. 2, the method includes the following steps.

Step 202, a third image of the document is obtained, where the third image contains an external face image.

In the embodiment of the present disclosure, the third image of the document may be obtained by the first image acquisition unit; the first image acquisition unit includes, but is not limited to, a camera, a scanner, and a digital camera, and therefore, first the current document is scanned by the scanner, or the current document is photographed by the camera/the digital camera, and then the external face image is obtained by means of OCR.

Optionally, the first image may further include external text information in addition to the external face image.

Step 204, chip information of the document is obtained, where the chip information contains a preset second face image.

Optionally, the chip recognizer may use a non-contact IC card reading technology, and reads the information in the chip after secure authentication with a special-purpose chip in the document is performed by an embedded Secure Access Module (SAM) in a wireless transmission mode.

Optionally, the chip information may further contain text information in addition to the preset second face image.

Step 206, the external face image is compared with the second face image to obtain a second comparison result.

In this embodiment, the external face image is compared with the stored face image to obtain a comparison result.

Optionally, when the first image contains the external text information and the chip information contains the stored text information, the external text information may further be compared with the stored text information to obtain a corresponding comparison result.

Step 208, the authenticity of the document is determined according to the second comparison result.

In an embodiment, if the external face image is consistent with the preset second face image in the chip information, it can be determined that the document is an authentic document; if the external face image is inconsistent with the preset second face image in the chip information, it can be determined that the document is not an authentic document; in addition, prompt information may further be output in the form of voice and/or text, the prompt information representing that the document is not an authentic document.

In an embodiment, when the first image contains text information and the chip information contains preset text information, in addition that the external face image is compared with the preset second face image contained in the chip information, the text information contained in the first image is further compared with the preset text information contained in the chip information to obtain a comparison result. At this time, if the external face image and the text information contained in the first image are consistent with the preset second face image and the text information contained in the chip information, it can be determined that the document is an authentic certificate; if the external face image and the text information contained in the first image are inconsistent with the preset second face image and the text information contained in the chip information, it can be determined that the document is not an authentic certificate; in addition, prompt information may further be output.

Optionally, the chip information of the document obtained in step 204 may be used for identity verification. That is, when it is determined that the document is an authentic certificate, the second image containing the face of the to-be-verified person is obtained; face comparison is performed on the second image and the second face image contained in the chip information of the document obtained in step 204 to obtain a comparison result; and an identity verification result is obtained according to the comparison result.

Based on the method for identity verification provided in the foregoing embodiment of the present disclosure, the external information of the built-in chip document and the information stored in the document are obtained, and the external information of the built-in chip document is compared with the information stored in the document to recognize the authenticity of the built-in chip document, so as to provide a simple and effective method for distinguishing the authenticity of the built-in chip document, and the theft of the other's identity by means of a spurious document can be prevented.

Optionally, in each of the foregoing embodiments, in addition to the face image, the first image may further contain a text part, where the text part may be text content recited in the chip information of the document.

Before face comparison is performed on the first image and the second image to obtain a comparison result, the first image may further be processed to separate the first face image and/or text part in the first image, so as to separate the first face image from the text part in the first image to obtain the first face image in the first image, and then face comparison may be performed on the first face image in the first image and the second image to obtain an identity verification result.

Optionally, before the face image and/or text part in the first image is separated, whether the first image contains a face image may further be determined; when the first image does not contain a face image, it is indicated that the document is located improperly, and a user is prompted to relocate the document. For example, the user may be prompted, in the form of voice, to relocate the current document.

Optionally, whether the first image contains a text part may further be determined; when the first image contains a text part, text recognition processing may be performed on the text part to obtain text information in the document. The process of performing text recognition processing on the text information in the current document in the method for identity verification provided in the embodiment of the present disclosure is described in detail below in combination with FIG. 3.

Figure 3:
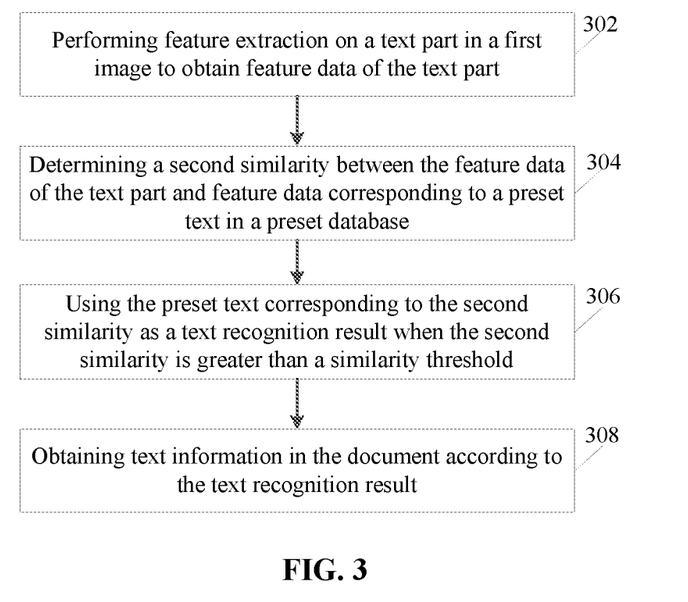
FIG. 3 is a flowchart III of a method for identity verification provided according to an embodiment of the present disclosure.

It should be understood that, the example shown in FIG. 3 is merely intended to help a person skilled in the art better understand the technical solution of the present disclosure, and should not be understood to limit the present disclosure. A person skilled in the art can make various transformations on the basis of FIG. 3; however, such transformations should also be understood to be a part of the technical solution of the present disclosure.

As shown in FIG. 3, the method includes the following steps.

Step 302, feature extraction is performed on the text part in the first image to obtain feature data of the text part.

Step 304, a second similarity between the feature data of the text part and feature data corresponding to a preset text in a preset database is determined.

Step 306, the preset text corresponding to the second similarity is used as a text recognition result when the second similarity is greater than a similarity threshold.

Step 308, the text information in the document is obtained according to the text recognition result.

In this embodiment, the text information in the document includes, but is not limited to, at least one piece of personal information in an information page, such as name, gender, nation, date of birth, address, and ID number.

In an embodiment, the performing feature extraction on the text part in the first image to obtain feature data of the text part includes: performing feature extraction on the text part in the first image through a neural network or other machine learning method. In an optional example, the neural network may use a convolutional neural network. Optionally, the neural network may also use other type of neural network. No limitation is made thereto in the embodiment of the present disclosure.

In an embodiment, the determining a second similarity between the feature data of the text part and feature data corresponding to a preset text in a preset database includes: determining the second similarity between the feature data of the text part and the feature data corresponding to the preset text in the preset database through the Euclidean distance or other similarity determining rule. No limitation is made thereto in the embodiment of the present disclosure.

In an embodiment, the method according to the embodiment of the present disclosure may further include: displaying the text information in the document. In an optional example, the text information in the document may be displayed while the face image in the first image, the second image, and the identity verification result are displayed.

Based on the method for identity verification provided in the foregoing embodiment of the present disclosure, when the face image in the document is compared with the face image of the to-be-verified person, by recognizing the text part in the document, the text information in the document may be obtained, so that the identity information of an owner of the document may be obtained; when the face image of the to-be-verified person is consistent with the face of the face image in the current document, the identity information of the to-be-verified person may be obtained by means of the text information in the document.

Figure 4:
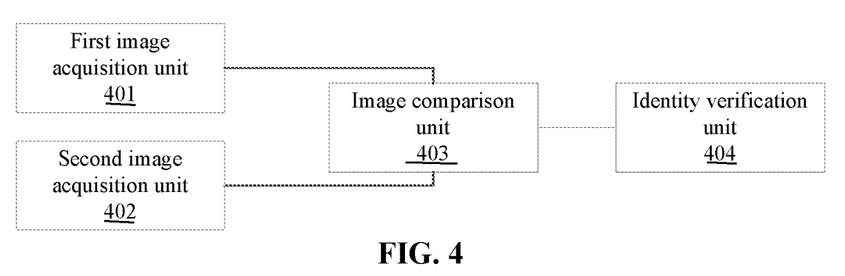
FIG. 4 is a schematic structural diagram I of an identity verification apparatus provided according to an embodiment of the present disclosure.

An embodiment of the present disclosure further provides an apparatus for identity verification. FIG. 4 is a schematic structural diagram I of an apparatus for identity verification provided according to an embodiment of the present disclosure.

It should be understood that, the example shown in FIG. 4 is merely intended to help a person skilled in the art better understand the technical solution of the present disclosure, and should not be understood to limit the present disclosure. A person skilled in the art can make various transformations on the basis of FIG. 4; however, such transformations should also be understood to be a part of the technical solution of the present disclosure.

As shown in FIG. 4, the apparatus includes: a first image acquisition unit 401, a second image acquisition unit 402, an image comparison unit 403, and an identity verification unit 404, where, the first image acquisition unit 401 is configured to obtain a first image of a document, where the first image contains a first face image;

the second image acquisition unit 402 is configured to obtain a second image containing a face of a to-be-verified person;

the image comparison unit 403 is configured to perform face comparison on the first image obtained by the first image acquisition unit 401 and the second image obtained by the second image acquisition unit 402 to obtain a first comparison result; and the identity verification unit 404 is configured to obtain an identity verification result according to the first comparison result obtained by the image comparison unit 403.

In the embodiment of the present disclosure, the document is a generic name of various certificates, cards, certificate photos and receipts. For example, the various certificates may be certificates containing a face photo such as ID cards, driving licenses, passports, student ID cards, or employee ID cards; the certificate photos may be black and white or color photos, etc. The first image may be an image acquired from a document containing a face photo. No limitation is made thereto in the embodiment of the present disclosure.

In the embodiment of the present disclosure, in an actual application, the first image acquisition unit 401 includes, but is not limited to, a camera, a scanner, a digital camera, and the like, and therefore, first the current document is scanned by the scanner, or the current document is photographed by the camera/the digital camera, and then the first image is obtained by means of OCR. No limitation is made thereto in the embodiment of the present disclosure.

In the embodiment of the present disclosure, the second image may be an image acquired on the scene, the second image acquisition unit 402 may be a camera or a digital camera or the like, and therefore, the second image may be obtained by photographing the to-be-verified person by the camera or the digital camera. No limitation is made thereto in the embodiment of the present disclosure. The first image acquisition unit 401 may be the same as or different from the second image acquisition unit 402.

In an optional embodiment, the first image acquisition unit 401 and the second image acquisition unit 402 may be the same image acquisition unit. For example, the first image acquisition unit 401 and the second image acquisition unit 402 may be the same camera or digital camera.

In an embodiment, the image comparison unit 403 performs face feature extraction on the face image in the first image to obtain first face feature data, performs face feature extraction on the second image to obtain at least one group of second face feature data, and separately compare the first face feature data with any of the at least one group of second face feature data to obtain a third comparison result.

In an embodiment, the image comparison unit 403 is configured to separately calculate a first similarity between the first face feature data and any of the at least one group of second face feature data, and use the calculated at least one group of first similarities as the third comparison result.

As an implementation, the image comparison unit 403 is configured to compare the first face feature data with any group of second face feature data through a neural network or other machine learning method. In an optional example, the neural network may use a convolutional neural network. Optionally, the neural network may also use other type of neural network. No limitation is made thereto in the embodiment of the present disclosure.

As an implementation, the image comparison unit 403 is configured to determine the first similarity between the first face feature data and any group of second face feature data through the Euclidean distance or other similarity determining rule. No limitation is made thereto in the embodiment of the present disclosure.

As an implementation, the identity verification unit 404 is configured to compare the obtained at least one group of first similarities with a preset threshold to obtain the identity verification result, where when any of the at least one group of first similarities is greater than the preset threshold, it is determined that identity verification succeeds, i.e., the to-be-verified person is the same as the person in the face photo in the document; and when the at least one group of first similarities is less than or equal to the preset threshold, it is determined that identity verification fails, i.e., the to-be-verified person is different from the person in the face photo in the document. The preset threshold may be determined according to statistics or other method. No limitation is made thereto in the embodiment of the present disclosure.

In an embodiment, the apparatus may further include: an information display unit, configured to display the face image in the first image, the second image, and the identity verification result, for example, the identity verification result is identified by text information "verification succeeds/verification fails", or an icon.

In an optional example, the information display unit may further display the face comparison result of the first image and the second image while displaying the face image in the first image, the second image, and the identity verification result, for example, the similarity value represented in the form of percentage.

Based on the apparatus for identity verification provided in the foregoing embodiments of the present disclosure, the first image of the document is obtained by the first image acquisition unit, where the first image contains a first face image, the second image containing a face of a to-be-verified person is obtained by the second image acquisition unit, face comparison is performed on the first image and the second image to obtain a comparison result, and an identity verification result is obtained according to the comparison result. Therefore, by performing face comparison on the acquired face image in the document and the face image acquired in real time, the identity verification of a holder of the document can be implemented when there is no chip reader, so that the inconsistency of the holder and the document and the theft of other's identity can be effectively prevented. Identity verification can be performed by using a document in which no chip is built, and therefore, the identity verification is more flexible, so that the application scenarios of the identity verification are expanded.

Figure 5:
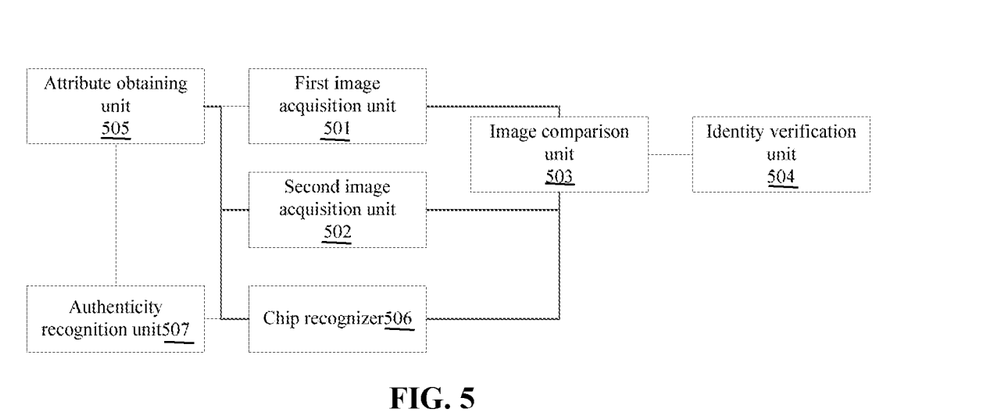
FIG. 5 is a schematic structural diagram II of an identity verification apparatus provided according to an embodiment of the present disclosure.

FIG. 5 is a schematic structural diagram II of an apparatus for identity verification provided according to an embodiment of the present disclosure. It should be understood that, the example shown in FIG. 5 is merely intended to help a person skilled in the art better understand the technical solution of the present disclosure, and should not be understood to limit the present disclosure. A person skilled in the art can make various transformations on the basis of FIG. 5; however, such transformations should also be understood to be a part of the technical solution of the present disclosure.

As shown in FIG. 5, compared with the embodiment of FIG. 4, the difference lies in that the apparatus in this embodiment further includes: an attribute obtaining unit 505, configured to obtain attributes of the document, where the attributes may include a built-in chip document and a non-built-in chip document; when the current document is a non-built-in chip document, a first image acquisition unit 501, a second image acquisition unit 502, an image comparison unit 503, and an identity verification unit 504 perform the same operations as those in the embodiment of FIG. 4, i.e., the first image acquisition unit 501 is configured to obtain, when the document is a non-built-in chip document, a first image of the document, where the first image contains a first face image.

Optionally, as shown in FIG. 5, the apparatus may further include: a chip recognizer 506, configured to obtain, when the document is a built-in chip document, chip information of the document, where the chip information contains a preset second face image; here, the second image acquisition unit 502 is configured to obtain a second image containing a face of a to-be-verified person; the image comparison unit 503 is configured to compare the second image with the preset second face image in the chip information to obtain a comparison result; the identity verification unit 504 is configured to obtain an identity verification result according to the comparison result.

Optionally, as shown in FIG. 5, the apparatus may further include: an authenticity recognition unit 507, configured to perform authenticity recognition processing on the document when the document is a built-in chip document; the second image acquisition unit 502 is further configured to obtain the second image containing the face of the to-be-verified person when the authenticity recognition processing result of the document indicates that the document is an authentic certificate.

Optionally, when authenticity recognition is performed on the current document, the first image acquisition unit 501 is configured to obtain a first image of the document, where the first image contains an external face image; the chip recognizer 506 is configured to obtain chip information of the document, where the chip information contains a preset second face image; the authenticity recognition unit 507 is configured to compare the external face image with the second face image to obtain a second comparison result, and determine the authenticity of the document according to the second comparison result.

Optionally, the chip recognizer 506 may use a non-contact IC card reading technology, and reads the information in the chip after secure authentication with a special-purpose chip in the document is performed by an embedded SAM in a wireless transmission mode.

In this embodiment, the authenticity recognition unit 507 is configured to compare the external face image with the preset second face image to obtain a second comparison result.

In an embodiment, if the external face image is consistent with the preset second face image, it can be determined that the document is an authentic certificate; if the external face image is inconsistent with the preset second face image, it can be determined that the document is not an authentic document; in addition, a prompt may further be provided for a user, for example, a prompt is provided in the form of voice/text.

In an embodiment, the first image obtained by the first image acquisition unit 501 may further include external text information in addition to the external face image.

In an embodiment, the chip information obtained by the chip recognizer 506 may further contain text information in addition to the preset face image.

In an embodiment, when the first image contains external text information and the chip information contains preset text information, the authenticity recognition unit 507 is further configured to compare the external text information with the preset text information to obtain a comparison result.

In an embodiment, when the authenticity recognition unit 507 compares the external face image and text information with the preset face image and text information to obtain comparison results, if the external face image and text information are consistent with the preset face image and text information, it can be determined that the document is an authentic certificate; if the external face image and text information are inconsistent with the stored face image and text information, it can be determined that the document is not an authentic certificate; in addition, prompt information may further be provided for a user.

In an embodiment, after it is determined that the document is an authentic certificate, the chip recognizer 506 is further configured to obtain a second face image preset in the chip information of the document for identity verification; at this time, the second image acquisition unit 502 is configured to obtain a second image containing a face of a to-be-verified person; the image comparison unit 503 is configured to perform face comparison on the second image and the second face image preset in the chip information to obtain a comparison result; the identity verification unit 504 is configured to obtain an identity verification result according to the comparison result.

Figure 6:
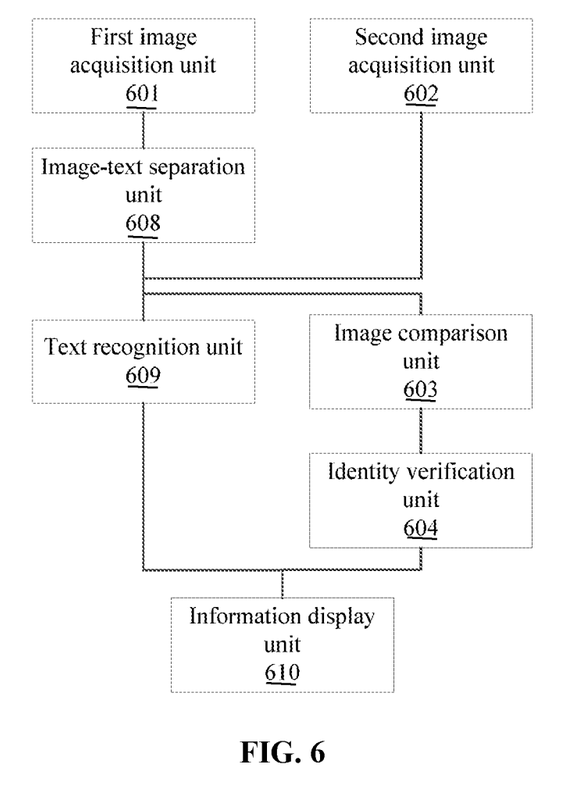
FIG. 6 is a schematic structural diagram III of an identity verification apparatus provided according to an embodiment of the present disclosure.

FIG. 6 is a schematic structural diagram III of an apparatus for identity verification provided according to an embodiment of the present disclosure. It should be understood that, the example shown in FIG. 6 is merely intended to help a person skilled in the art better understand the technical solution of the present disclosure, and should not be understood to limit the present disclosure. A person skilled in the art can make various transformations on the basis of FIG. 6; however, such transformations should also be understood to be a part of the technical solution of the present disclosure.

As shown in FIG. 6, compared with the embodiment of FIG. 4, the difference lies in that the apparatus in this embodiment further includes: an image-text separation unit 608, configured to process the first image to separate the first face image and/or text part in the first image. At this time, in addition to the first face image, the first image of the document obtained by an image acquisition unit 601 may further contain a text part, where the text part may be text content recited in the chip information of the document.

In an embodiment, the apparatus may further include: a first detection unit and an information prompt unit; the first detection unit is configured to determine whether the first image contains a face image, and the information prompt unit is configured to prompt a user to relocate the document when the first detection unit determines that the first image does not contain a face image.

In an embodiment, as shown in FIG. 6, the apparatus may further include: a second detection unit and a text recognition unit 609; the second detection unit is configured to determine whether the first image contains a text part, and the text recognition unit 609 is configured to perform, when the second detection unit determines that the first image contains a text part, text recognition processing on the text part in the first image to obtain text information in the document.

In the embodiment of the present disclosure, the text information in the document includes, but is not limited to, at least one piece of personal information in an information page, such as name, gender, nation, date of birth, address, and ID number.

In an embodiment, the text recognition unit 609 is configured to perform feature extraction on the text part in the first image to obtain feature data of the text part, determine a second similarity between the feature data of the text part and feature data corresponding to a preset text in a preset database, use the preset text corresponding to the second similarity as a text recognition result when the second similarity is greater than a similarity threshold, and obtain the text information in the document according to the text recognition result.

In an embodiment, the text recognition unit 609 is configured to perform feature extraction on the text part in the first image through a neural network or other machine learning method. In an optional example, the neural network may use a convolutional neural network. Optionally, the neural network may also use other type of neural network. No limitation is made thereto in the embodiment of the present disclosure.

In an embodiment, the text recognition unit 609 is configured to determine the second similarity between the feature data of the text part and the feature data corresponding to the preset text in the preset database through the Euclidean distance or other similarity determining rule. No limitation is made thereto in the embodiment of the present disclosure.

In an embodiment, as shown in FIG. 6, the apparatus may further include: an information display unit 610, configured to display the face image in the first image, the second image, the identity verification result, and the text information in the document.

In addition, an embodiment of the present disclosure further provides an electronic device, which may be, for example, a mobile terminal, a Personal Computer (PC), a tablet computer, or a server. The apparatus for identity verification according to any one of the foregoing embodiments of the present disclosure is disposed in the electronic device.

Figure 7:
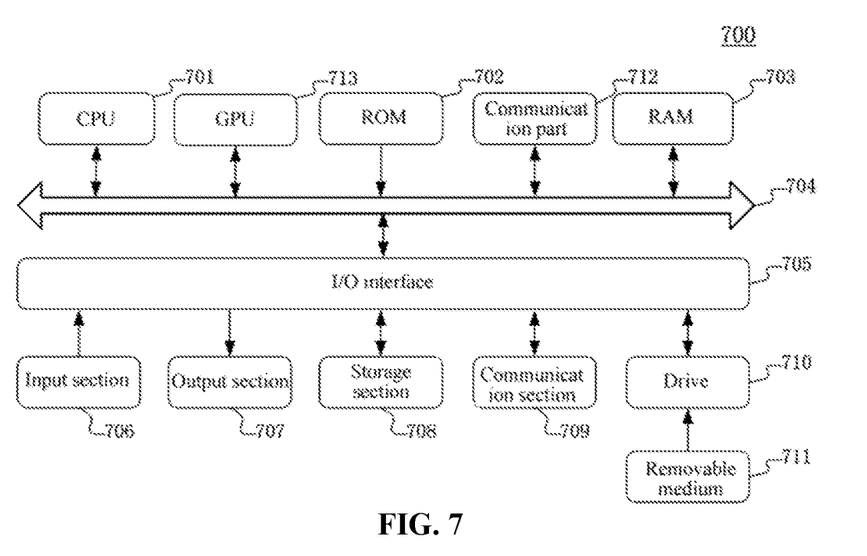
FIG. 7 is a schematic structural diagram of an embodiment of an electronic device according to embodiments of the present disclosure.

An embodiment of the present disclosure further provides an electronic device, which may be, for example, a mobile terminal, a PC, a tablet computer, or a server. With reference to FIG. 7 below, FIG. 7 is a schematic structural diagram of an electronic device 700 suitable for implementing a terminal device or a server of an embodiment of the present disclosure. As shown in FIG. 7, the electronic device includes 700 includes one or more processors, a communication part, and the like. The one or more processors are, for example, one or more Central Processing Units (CPUs) 701, and/or one or more Graphic Processing Units (GPUs) 713, and the like. The processor may perform various appropriate actions and processing according to executable instructions stored in a Read-Only Memory (ROM) 702 or executable instructions loaded from a storage section 708 to a Random-Access Memory (RAM) 703. The communication part 712 may include, but is not limited to, a network card. The network card may include, but is not limited to, an Infiniband (IB) network card.

The processor may communicate with the ROM 702 and/or the RAM 703 to execute executable instructions. The processor is connected to the communication part 712 via a bus 704, and communicates with other target devices via the communication part 712, thereby completing corresponding operations of the method for identity verification provided in any one of the embodiments of the present disclosure, for example, obtaining a first image of a current document, where the first image contains a first face image, obtaining a second image containing a face of a to-be-verified person, performing face comparison on the first image and the second image to obtain a first comparison result, and obtaining an identity verification result according to the first comparison result.

In addition, the RAM 703 may further store various programs and data required during an operation of the apparatus. The CPU 701, the ROM 702, and the RAM 703 are connected to each other via the bus 704. In the presence of the RAM 703, the ROM 702 is an optional module. The RAM 703 stores executable instructions, or writes executable instructions to the ROM 702 during running. The executable instructions cause the processor 501 to execute the corresponding operations of the communication method. An Input/Output (I/O) interface 705 is also connected to the bus 704. The communication part 712 may be integrated, or may be configured to have a plurality of sub-modules (for example, a plurality of IB network cards) connected to the bus.

The following components are connected to the I/O interface 705: an input section 706 including a keyboard, a mouse, and the like; an output section 707 including a Cathode-Ray Tube (CRT), a Liquid Crystal Display (LCD), a speaker, and the like; the storage section 708 including a hard disk and the like; and a communication section 709 of a network interface card including an LAN card, a modem, and the like. The communication section 709 performs communication processing via a network such as the Internet. A drive 710 is also connected to the I/O interface 705 according to requirements. A removable medium 711 such as a magnetic disk, an optical disk, a magneto-optical disk, a semiconductor memory, or the like is mounted on the drive 710 according to requirements, so that a computer program read from the removable medium may be installed on the storage section 708 according to requirements.

It should be noted that, the architecture shown in FIG. 7 is merely an optional implementation. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the protection scope of the present disclosure.

Particularly, the process described above with reference to the flowchart according to an embodiment of the present disclosure may be implemented as a computer software program. For example, an embodiment of the present disclosure includes a computer program product, including a computer program tangibly included in a machine-readable medium. The computer program includes a program code for executing the method shown in the flowchart. The program code may include instructions for executing the corresponding steps of the method according to the embodiments of the present disclosure, for example, obtaining a first image of a current document, where the first image contains a first face image, obtaining a second image containing a face of a to-be-verified person, performing face comparison on the first image and the second image to obtain a first comparison result, and obtaining an identity verification result according to the first comparison result. In such embodiment, the computer program is downloaded and installed from the network through the communication section 709, and/or is installed from the removable medium 711. The computer program, when being executed by the CPU 701, executes the foregoing functions defined in the method of the present disclosure.

In one or more optional implementations, an embodiment of the present disclosure further provides a computer program product, configured to store computer-readable instructions, where when the instructions are executed, a computer executes the method for identity verification in any one of the possible implementations.

The computer program product may specifically be implemented by means of hardware, software, or a combination thereof. In an optional example, the computer program product is specifically represented by a computer storage medium. In another optional example, the computer program product is specifically embodied by a software product, such as Software Development Kit (SDK).

In one or more optional implementations, an embodiment of the present disclosure further provides a method for identity verification and a corresponding apparatus, an electronic device, a computer storage medium, a computer program, and a computer program product. The method includes: a first apparatus sends an identity verification instruction to a second apparatus, the instruction enabling the second apparatus to execute the method for identity verification in any one of the possible embodiments; and the first apparatus receives an identity verification result sent by the second apparatus.

In some embodiments, the identity verification instruction may specifically be an invocation instruction. The first apparatus may instruct the second apparatus to perform identity verification by means of invocation; correspondingly, the second apparatus may perform the steps and/procedures in any one of the embodiments in the method for identity verification in response to reception of the invocation instruction.

It should be understood that, the terms such as "first" and "second" in the embodiments of the present disclosure are merely for distinguishing, and should not be understood to define the embodiments of the present disclosure.

It should further be understood that, in the present disclosure, "a plurality of" may refer to two or more, and "at least one" may refer to one, two, or more.

It should further be understood that, for any component, data or structure mentioned in the present disclosure, in the case that no explicit definition is provided or no opposite teaching is provided in the context, it may be understood that the number of the component, data or structure is one or more.

It should further be understood that, the descriptions in the present disclosure on the embodiments focus on differences between the embodiments, and for same or similar parts in the embodiments, refer to these embodiments. For conciseness, the details are not described again.

The methods, apparatuses, and devices in the present disclosure may be implemented in many manners. For example, the methods, apparatuses, and devices in the present disclosure may be implemented with software, hardware, firmware, or any combination of software, hardware, and firmware. The foregoing sequence of the steps of the method is merely for description, and unless otherwise stated particularly, is not intended to limit the steps of the method in the present disclosure. In addition, in some embodiments, the present disclosure may alternatively be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe the principles and actual applications of the present disclosure, and to make a person of ordinary skill in the art understand the present disclosure, so as to design various embodiments with various modifications applicable to particular use.

The invention claimed is:

1. A method for identity verification, comprising:
    obtaining attributes of a document, the attributes comprising a built-in chip document and a non-built-in chip document;
    obtaining a first image of the document by a camera when the document is a non-built-in chip document, obtaining the first image of the document by a chip recognizer when the document is a built-in chip document, wherein the first image contains a first face image;
    obtaining a second image containing a face of a to-be-verified person;
    performing face comparison on the first image and the second image to obtain a first comparison result; and
    obtaining an identity verification result according to the first comparison result;
    wherein before the step of performing face comparison on the first image and the second image to obtain a first comparison result, the method further comprises;
    processing the first image to separate the first face image and/or text part in the first image;
    wherein the method further comprises;
    determining whether the first image contains a text part; and
    performing, when the first image contains a text part, feature extraction on the text part in the first image through a neural network to obtain feature data of the text part;
    determining a second similarity between the feature data of the text part and feature data corresponding to a preset text in a preset database;
    using the preset text corresponding to the second similarity as a text recognition result when the second similarity is greater than a similarity threshold; and
    obtaining the text information in the document according to the text recognition result.

2. The method according to claim 1, further comprising:
    performing authenticity recognition processing on the document when the document is a built-in chip document; and
    obtaining the second image containing the face of the to-be-verified person when the authenticity recognition processing result on the document indicates that the document is an authentic document.

3. The method according to claim 2, wherein the step performing authenticity recognition processing on the document comprises:
    obtaining a third image of the document, wherein the third image contains an external face image;
    obtaining chip information of the document, wherein the chip information contains a preset second face image;
    comparing the external face image with the second face image to obtain a second comparison result; and
    determining the authenticity of the document according to the second comparison result.

4. The method according to claim 1, wherein the step of performing face comparison on the first image and the second image to obtain a first comparison result comprises:
    performing face feature extraction on the face image in the first image to obtain first face feature data;
    performing face feature extraction on the second image to obtain at least one group of second face feature data; and
    separately comparing the first face feature data with any of the at least one group of second face feature data to obtain a third comparison result.

5. The method according to claim 4, wherein the step of separately comparing the first face feature data with any of the at least one group of second face feature data to obtain a third comparison result comprises:
    separately calculating a first similarity between the first face feature data and any of the at least one group of second face feature data; and
    using the calculated at least one group of first similarities as the third comparison result.

6. The method according to claim 5, wherein the step of obtaining an identity verification result according to the first comparison result comprises:
    determining that identity verification succeeds when any of the at least one group of first similarities is greater than a preset threshold; and
    determining that identity verification fails when the at least one group of first similarities is less than or equal to the preset threshold.

7. The method according to claim 1, wherein after the step of obtaining an identity verification result according to the first comparison result, the method further comprises:
    displaying the face image in the first image, the second image, and the identity verification result.

8. The method according to wherein before the step of separating the face image and/or text part in the first image, the method further comprises:
    determining whether the first image contains a face image; and
    when the first image does not contain a face image, prompting a user to relocate the document.

9. The method according to claim 1, further comprising:
    displaying the face image in the first image, the second image, the identity verification result, and the text information in the document.

10. An apparatus for identity verification, comprising:
    a processor;
    a memory for storing instructions executable by the processor;
    wherein the processor is configured to:
    obtain attributes of a document, the attributes comprising a built-in chip document and a non-built-in chip document;
    obtain a first image of the document by a camera when the document is a non-built-in chip document, obtaining the first image of the document by a chip recognizer when the document is a built-in chip document, wherein the first image contains a first face image;
    obtain a second image containing a face of a to-be-verified person;
    perform face comparison on the first image and the second image to obtain a first comparison result; and
    obtain an identity verification result according to the first comparison result;
    wherein the processor is further configured to, before performing face comparison on the first image and the second image to obtain a first comparison result, process the first image to separate the first face image and/or text part in the first image;
    determine whether the first image contains a text part; and
    perform, when the first image contains a text part, feature extraction on the text part in the first image through a neural network to obtain feature data of the text part;
    determine a second similarity between the feature data of the text part and feature data corresponding to a preset text in a preset database;
    use the preset text corresponding to the second similarity as a text recognition result when the second similarity is greater than a similarity threshold; and
    obtain the text information in the document according to the text recognition result.

11. The apparatus according to claim 10, wherein the processor is further configured to:
    perform authenticity recognition processing on the document when the document is a built-in chip document;
    obtain the second image containing the face of the to-be-verified person when the authenticity recognition processing result of the document indicates that the document is an authentic certificate.

12. The apparatus according to claim 11, wherein the processor is further configured to obtain a third image of the document, wherein the third image contains an external face image;
    the apparatus further comprises: a chip recognizer, configured to obtain chip information of the document, wherein the chip information contains a preset second face image;
    the processor is configured to compare the external face image with the second face image to obtain a second comparison result, and determine the authenticity of the document according to the second comparison result.

13. The apparatus according to claim 10, wherein the processor is configured to perform face feature extraction on the face image in the first image to obtain first face feature data, perform face feature extraction on the second image to obtain at least one group of second face feature data, and separately compare the first face feature data with any of the at least one group of second face feature data to obtain a third comparison result.

14. A non-transitory computer storage medium having stored therein instructions that, when executed by a processor, causes the operations of:
    obtaining attributes of a document, the attributes comprising a built-in chip document and a non-built-in chip document;
    obtaining a first image of the document by a camera when the document is a non-built-in chip document, obtaining the first image of the document by a chip recognizer when the document is a built-in chip document, wherein the first image contains a first face image;
    obtaining a second image containing a face of a to-be-verified person;
    performing face comparison on the first image and the second image to obtain a first comparison result; and
    obtaining an identity verification result according to the first comparison result;
    wherein before the step of performing face comparison on the first image and the second image to obtain a first comparison result, the method further comprises;
    processing the first image to separate the first face image and/or text part in the first image;
    wherein the method further comprises;
    determining whether the first image contains a text part; and
    performing, when the first image contains a text part, feature extraction on the text part in the first image through a neural network to obtain feature data of the text part;
    determining a second similarity between the feature data of the text part and feature data corresponding to a preset text in a preset database;
    using the reset text corresponding to the second similarity as a text recognition result when the second similarity is greater than a similarity threshold; and
    obtaining the text information in the document according to the text recognition result.

* * * * *